United States Patent [19]

Lampl

[11] Patent Number: 4,710,953
[45] Date of Patent: Dec. 1, 1987

[54] SPEECH CONTROL IN A TELEPHONE STATION

[75] Inventor: Josef Lampl, Schoengeising, Fed. Rep. of Germany

[73] Assignee: Siemens Aktiengesellschaft, Berlin and Munich, Fed. Rep. of Germany

[21] Appl. No.: 924,310

[22] Filed: Oct. 29, 1986

[30] Foreign Application Priority Data

Nov. 26, 1985 [DE] Fed. Rep. of Germany ....... 3541794

[51] Int. Cl.$^4$ ............................................. H04M 1/58
[52] U.S. Cl. .................................. 379/391; 379/387; 379/390
[58] Field of Search .................... 379/202, 387–392, 379/399, 406–409

[56] References Cited

U.S. PATENT DOCUMENTS

4,648,110  3/1987  Elsässer ............................. 379/390

FOREIGN PATENT DOCUMENTS

2445420  4/1976  Fed. Rep. of Germany.
2714132  10/1978 Fed. Rep. of Germany.
60-134548  7/1985  Japan .................................. 379/390
60-230753  11/1985 Japan .................................. 379/390

Primary Examiner—Gene Z. Rubinson
Assistant Examiner—Mark E. Ham
Attorney, Agent, or Firm—Hill, Van Santen, Steadman & Simpson

[57] ABSTRACT

A speech control is provided for a telephone station and provides, dependent upon speech direction, the transmitting channel or the receiving channel being attenuated or the receiving channel being attenuated or the receiving channel or the transmitting channel being de-attenuated with a structure which is as simple as possible to manufacture with, inexpensive, non-critical components. A potentiometer is provided in each channel for setting the volume and the potentiometers are simultaneously and symmetrically operated with a single operating element. The potentiometers, dependent on speech direction, determined by a speech analyzer, are simultaneously shorted or simultaneously activated. The shorting in the transmission channel has a de-attenuating effect and has an attenuating effect in the receiving channel. When the potentiometers are in the activated condition, they cause the opposite effect.

1 Claim, 1 Drawing Figure

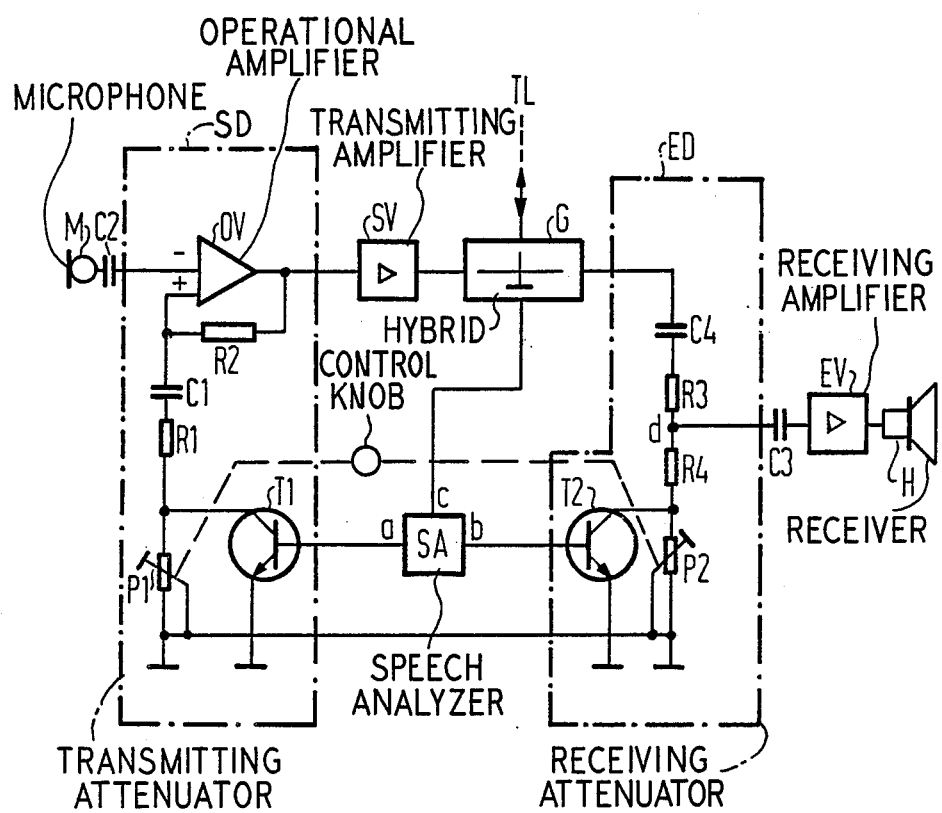

SPEECH CONTROL IN A TELEPHONE STATION

BACKGROUND OF THE INVENTION

1. Field of the Invention

The present invention relates to a speech control in a telephone station in which, dependent on the operating direction and controlled by a speech analyzer, a receiving attenuation is connected and a transmission attenuation is disconnected or, respectively, a receiving attenuation is disconnected and a transmission attenuation is connected, and in which both a receiving repeater and a transmission repeater are provided.

2. Description of the Prior Art

Such a speech control is generally known from the German published application No. 24 45 420 (German Pat. No. 27 14 132) which likewise comprises a transmitting and receiving repeater and wherein, proceeding from a defined quiescent condition, attenuation elements are automatically connected or disconnected at the transmitting side or at the receiving side, dependent on the voice direction recognition.

SUMMARY OF THE INVENTION

It is the object of the invention to provide a speech control in the most simple possible manner given adequate functional effect in view of mass production, whereby low tolerance requirements should also be made of the components required for this purpose.

The object is achieved, according to the present invention, in that a respective, manually variable ohmic resistor of the same order of magnitude is provided for changing the receiving attenuation and for changing the transmission attentuation, whereby the variation of both resistors occurs symmetrically by way of only one actuation element. Furthermore, the two resistors are simulataneously shorted or simultaneously activated dependent on the speaking direction via a respective switch which is controlled by the voice analyzer, and the resistor for the transmitting attenuation is connected between a feedback path (+) of an operational amplifier which amplifies the microphone signals and ground, and the resistor for the receiving attenuation is connected between the control input of the receiving repeater and ground.

With the above structure, the advantages achieved that a voice control for a telephone station can be realized with the most simple and economical components, whereby an adequate and individual function is established, and whereby the voice control can be controlled given both quiescent condition at the transmitting side and a quiescent condition at the receiving side, as well as a center quiescent condition.

BRIEF DESCRIPTION OF THE DRAWING

Other objects, features and advantages of the invention, its organization, construction and operation will be best understood from the following detailed description, taken in conjunction with the accompanying drawing on which there is a smaller figure showing, in a schematic diagram, a telephone station constructed in accordance with the present invention.

DESCRIPTION OF THE PREFERRED EMBODIMENT

On the drawing, a transmission attenuator SD is illustrated, along with a receiving attenuator ED, a transmitting repeater SV, a receiving repeater EV, a voice direction analyzer SA, a hybrid G, a microphone M, a receiver H and a pair of coupling capacitors C2 and C3. The transmitting attenuator SD comprises an operational amplifier OV, a feedback resistor R2, a dropping resistor R1, a variable resistor P1, a transistor T1 (switch), and the coupling capacitor C1. The receiving attenuator ED comprises the coupling capacitor C4, a pair of dropping resistors R3 and R4, a variable resistor P2 and a transistor T2 (switch).

The manner of operation of the circuit arrangement illustrated on the drawing shall be set forth in greater detail below. In this explanation, it is assumed that the quiescent condition at the transmitting side exists. This means that a "h" signal (h level) is output at the control outputs a and b of the speech analyzer SA, this "h" signal driving the two transistors T1 and T2 in the transmitting attenuator SD or, respectively, the receiving attenuator ED. The two variable resistors P1 and P2 are therefore shorted by the respective transistors T1 and T2. The shorting of the resistor P1 provides that ground potential is applied to the positive input (+) of the operational amplifier OV (the transistor T1 being conductive) via the transistor T1, the resistor R1, and the capacitor C1, and that speech signal applied via the microphone M (and the capacitor C2) is relatively highly amplified and is fed to the transmission repeater or amplifier SV. From the transmission repeater SD, the amplified signal proceeds via the hybrid G onto the subscriber line TL. In the receiving attenuator, the variable resistor P2 is likewise ridged by the transistor T2, which means that only the ohmic resistor R4 lies between the control input d of the receiving repeating EV and ground potential. A signal potentially existing, which is applied at the input d via the subscriber line TL, the hybrid G, the capacitor C4 and resistor R3, and which is not interpreted as "receive mode" by the speech evaluator SA is therefore fed to the receiving repeater EV via the capacitor C3 with only a low intensity. The speech evaluator SA corresponds to the voice direction recognition circuit of the German allowed and published application 24 45 420. Only a slight signal amplification occurs.

When the speech evaluator SA recognizes a receive mode via its input c, it then emits a low potential (1 level) at its control outputs a and b and each of the transistors T1 and T2 therefore correspond to an open switch and the variable resistors P1 and P2 are fully effective. Analogous to that set forth above, the operational amplifier OV is highly resistant for a signal from the microphone M and therefore represents an attenuator. The resistors R4 and P2 now lie in the receiving channel between the control input d of the receiving repeater EV and grounds potential, so that an incoming received signal takes full effect via the control input d and is correspondingly amplified. A de-attenuation of the receiving channel therefore exists. The degree of de-attenuation or, respectively, attentuation of the receiving channel and the transmitting channel in the speech control of the present invention is therefore dependent on the curve of resistance of the two variable resistors P1 and P2. What is referred to as a tandem potentiometer is advantageously employed here, whereby, therefore, both of the resistors P1 and P2 are symmetrically variable in the same direction via an operating element. In other words, the potentiometers are ganged. A continuous attentuation or de-attentuation therefore occurs between the transmitting channel and the receiving channel with arbitrary overall increase and the one channel is only attentuated by the amount by which the other channel is de-attenuated (by setting the desired volume).

This speech control, of course, is also useable when an intial position (quiescent condition at the recieving side) is assumed. In the quiescent condition of the telephone station, a low level is applied to the control inputs a and b of the speech evaluator SA instead of a high level. A center quiescent position can also be realized by way of an additional, slight expense in the signal evaluator.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and preferably be included within the scope of my contribution to the art.

I claim:

1. In a telephone station of the type which includes a transmission channel and a receiving channel which are connected by way of a hybrid to a subscriber line, in which the transmission channel includes a transmitting amplifier, and in which the receiving channel includes a receiving amplifier, the improvement therein comprising:

a speech analyzer including an input connected to the hybrid and first and second outputs, said speech analyzer operable in response to speech signals in the transmitting direction to provide a first signal at both of said first and second outputs and operable in response to speech signals in the receiving direction to produce a second signal both of said first and second outputs;

transmission attenuation means connected in said transmission channel, said transmission attentuation means comprising an operational amplifier including a first input for receiving speech signals to be transmitted, an output connected to the transmitting amplifier, and a second input, a feedback circuit connected between said output and said second input of said operational amplifier, a first variable resistor connected in circuit with said second input of said operational amplifier and said feedback path and connected to a reference potential, and a first switch connected across said first variable resistor and including a control input connected to said first output of said speech analyzer; and receiving attenuation means connected in the receiving channel between the hybrid and the receiving amplifier, said receiving attenuation means comprising a second variable resistor connected between the receiving amplifier and the reference potential, and a second switch connected across said second variable resistor and including a control input connected to said second output of said speech analyzer;

means connecting said first and second variable resistors for symmetrical operation including a single actuating element, said first and second switches operable to close in response to said first signal and short the respective variable resistors and operable to open in response to said second signal so that the respective variable resistors are effective for controlling attenuation.

* * * * *